US012574818B2

(12) United States Patent
Sharma et al.

(10) Patent No.: US 12,574,818 B2
(45) Date of Patent: Mar. 10, 2026

(54) USER EQUIPMENT MOBILITY WITH SPECIFIC UPLINK BANDWIDTH PART

(71) Applicant: QUALCOMM Incorporated, San Diego, CA (US)

(72) Inventors: Prashant Sharma, San Jose, CA (US); Muhammad Nazmul Islam, Littleton, MA (US); Chun-Hao Hsu, San Jose, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 18/170,051

(22) Filed: Feb. 16, 2023

(65) Prior Publication Data

US 2023/0269651 A1 Aug. 24, 2023

Related U.S. Application Data

(60) Provisional application No. 63/312,062, filed on Feb. 20, 2022.

(51) Int. Cl.
| | |
|---|---|
| *H04W 36/00* | (2009.01) |
| *H04W 36/06* | (2009.01) |
| *H04W 36/32* | (2009.01) |
| *H04W 76/20* | (2018.01) |

(52) U.S. Cl.
CPC ........... *H04W 36/32* (2013.01); *H04W 36/06* (2013.01); *H04W 76/20* (2018.02)

(58) Field of Classification Search
None
See application file for complete search history.

(56) References Cited

U.S. PATENT DOCUMENTS

2022/0303892 A1* 9/2022 Awadin ................. H04W 72/23

FOREIGN PATENT DOCUMENTS

WO WO-2021159244 A1 * 8/2021 .......... H04W 68/025
WO WO-2022030867 A1 * 2/2022 ........ H04W 74/0833

OTHER PUBLICATIONS

Huawei., et al., "On BWP Switching Time for Redcap UE", 3GPP TSG-RAN4 WG4 Meeting #100-e, R4-2114490, 3RD Generation Partnership Project (3GPP), Mobile Competence Centre, 650, Route Des Lucioles, F-06921, Sophia-Antipolis Cedex, France, vol. RAN WG4, No. Electronic meeting, Aug. 16-Aug. 27, 2021, Aug. 6, 2021, 6 Pages, XP052037689, p. 3, Paragraph 2.2-p. 4, Paragraph 2.2.1.

(Continued)

*Primary Examiner* — Gerald A Smarth
(74) *Attorney, Agent, or Firm* — Patterson & Sheridan LLP

(57) ABSTRACT

Certain aspects of the present disclosure provide techniques for wireless communication by a user equipment (UE). According to certain aspects, a UE may be configured to detect, in a first bandwidth part (BWP), a condition triggering a mobility procedure that involves a physical random access channel (PRACH) transmission in a second BWP, determining a timeline for transmitting the PRACH in the second BWP, based on a mobility procedure delay that accounts for BWP switching time for switching from the first BWP to the second BWP, and transmitting the PRACH in the second BWP in accordance with the timeline.

24 Claims, 12 Drawing Sheets

(56)  References Cited

OTHER PUBLICATIONS

International Search Report and Written Opinion—PCT/US2023/062797—ISA/EPO—May 22, 2023.

Moderator (Ericsson) : "Email Discussion Summary for [101-bis-e] [220] NR_redcap_RRM_1", 3GPP TSG-RAN WG4 Meeting# 101-bis-e, R4-2202737, 3rd Generation Partnership Project (3GPP), Mobile Competence Centre, 650, Route Des Lucioles, F-06921, Sophia-Antipolis Cedex, France, vol. RAN WG4, No. Electronic Meeting, Jan. 17-Jan. 25, 2022, Jan. 25, 2022, 173 Pages, XP052103570, Issue 1-1-4, p. 22, Issue 4-5-1, p. 118.

Qualcomm Incorporated: "BW Reduction for RedCap UE", 3GPP TSG-RAN WG1 Meeting #106bis-e, R1-2110193, 3GPP, Mobile Competence Centre, 650, Route Des Lucioles, F-06921, Sophia-Antipolis Cedex, France, vol. RAN WG1, No. e-Meeting, Oct. 11-Oct. 19, 2021, Oct. 2, 2021, pp. 1-28, XP052059129, p. 11, Ln 1-2, Para 2.3, 4th Agreement; p. 1, Para 1 p. 6, Fig 6 p. 8, Ln 1, Para 2.2 p. 5, Ln 2-5 p. 5, Ln 6-9 Observation 6, p. 5,7, Ln 1-2, Proposal 11 p. 8, 5, Ln 27-28, 3rd Agreement, p. 1, Ln 3-4 p. 7, Ln 10-11, p. 9, Ln 8-10 p. 9, Table 1.

\* cited by examiner

500

800

| Non-RedCap initial DL BWP | RedCap initial DL BWP | RedCap non-initial DL BWP |
|---|---|---|
| Contains SSB, RACH CSS & CORESET0 | Contains RACH CSS Does not contain SSB | May/may not contain SSB and system info |

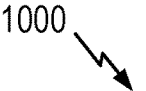
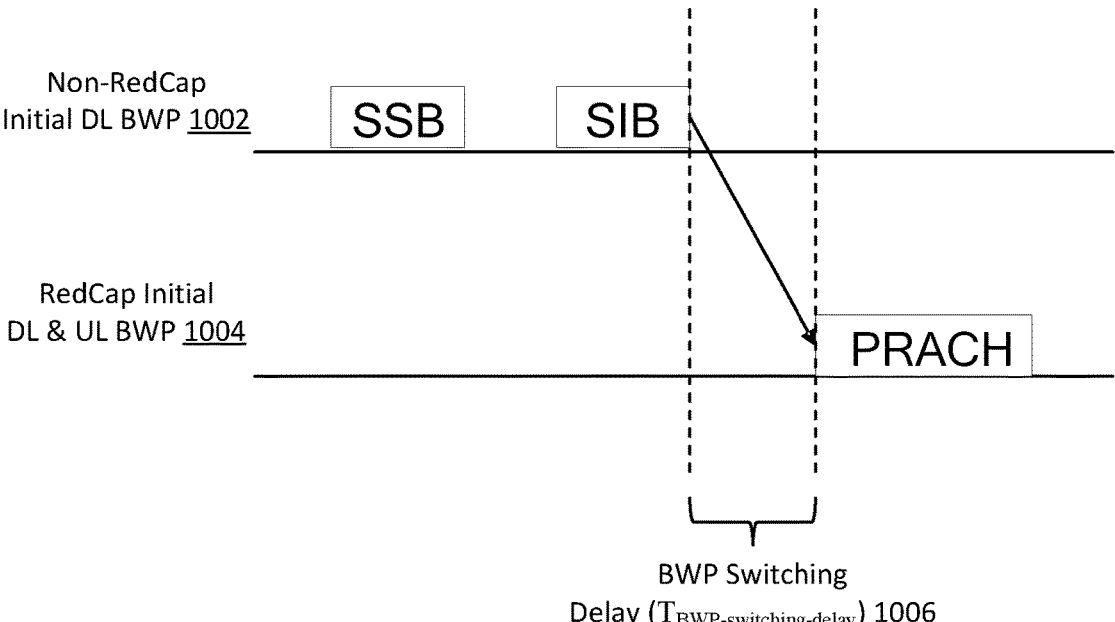
FIG. 10

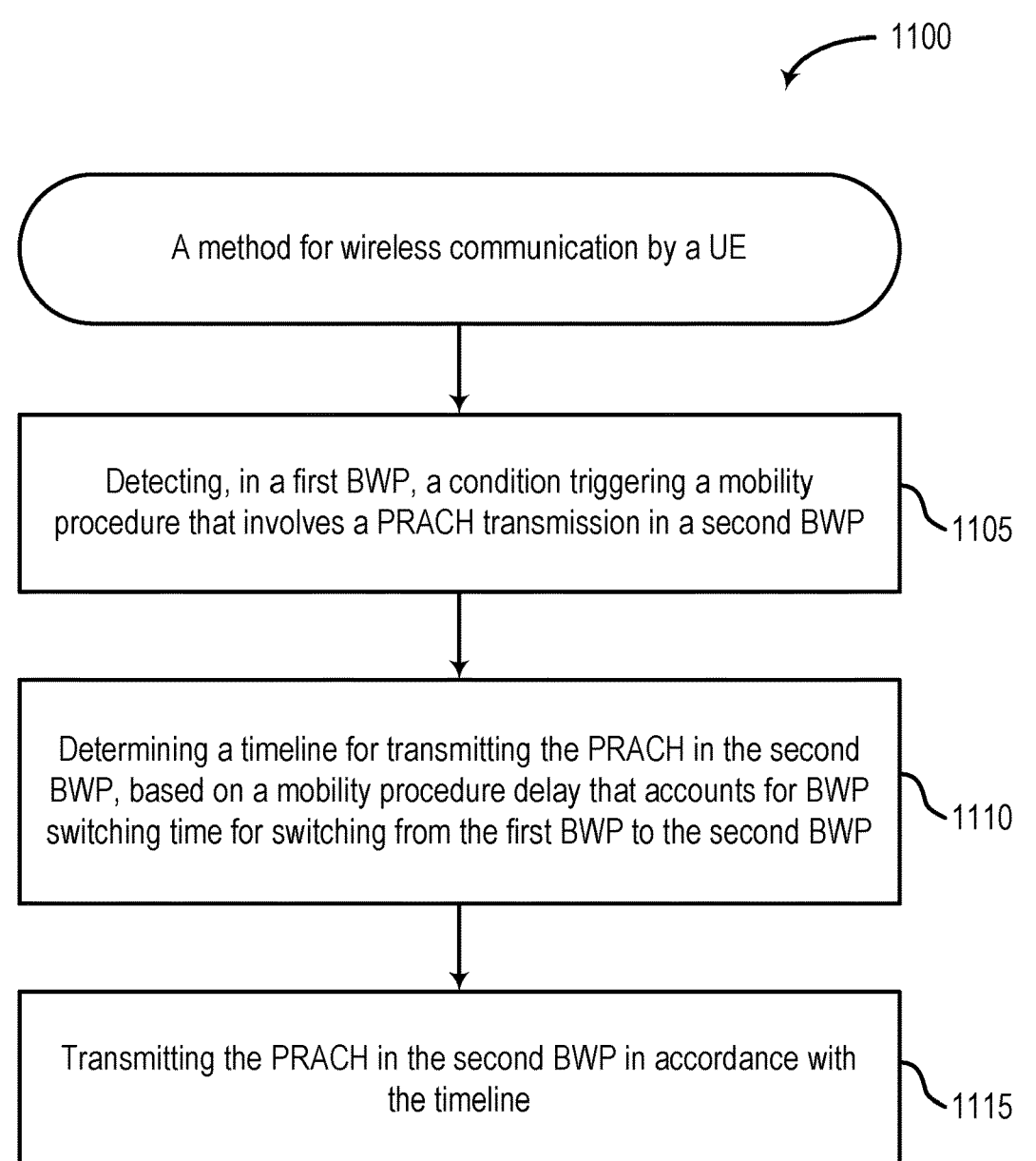

1100

A method for wireless communication by a UE

Detecting, in a first BWP, a condition triggering a mobility procedure that involves a PRACH transmission in a second BWP — 1105

Determining a timeline for transmitting the PRACH in the second BWP, based on a mobility procedure delay that accounts for BWP switching time for switching from the first BWP to the second BWP — 1110

Transmitting the PRACH in the second BWP in accordance with the timeline — 1115

*FIG. 11*

USER EQUIPMENT MOBILITY WITH SPECIFIC UPLINK BANDWIDTH PART

CROSS-REFERENCE TO RELATED APPLICATIONS

This application claims priority to U.S. Provisional Application No. 63/312,062, filed Feb. 20, 2022, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for determining timelines for performing mobility procedures.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), including detecting, in a first bandwidth part (BWP), a condition triggering a mobility procedure that involves a physical random access channel (PRACH) transmission in a second BWP; determining a timeline for transmitting the PRACH in the second BWP, based on a mobility procedure delay that accounts for BWP switching time for switching from the first BWP to the second BWP; and transmitting the PRACH in the second BWP in accordance with the timeline.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts an example timeline for performing a mobility procedure that accounts for BWP switching, in accordance with aspects of the present disclosure.

FIG. 11 depicts a method for wireless communication.

DETAILED DESCRIPTION

Figure 1:
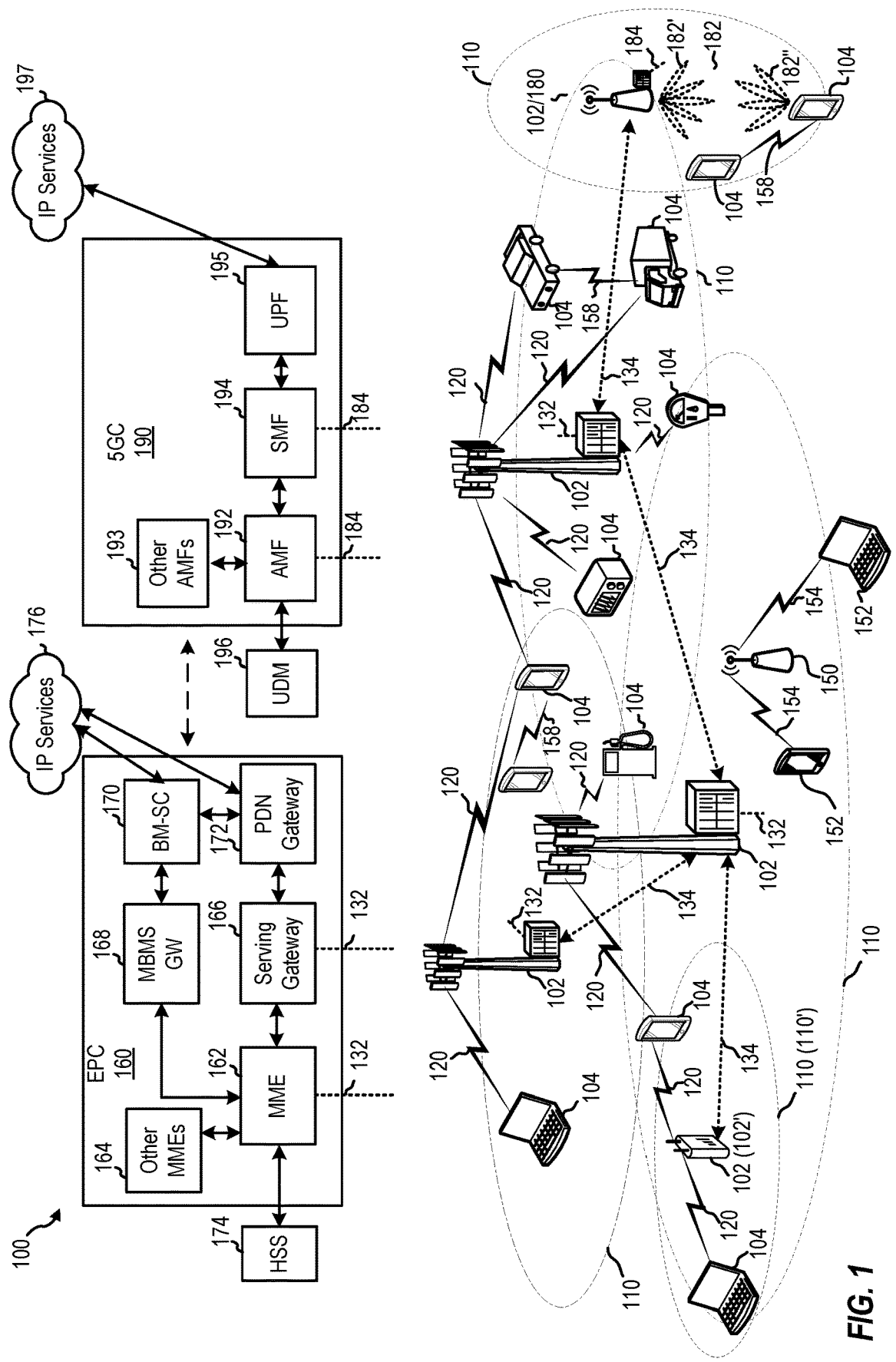
FIG. 1 depicts an example wireless communication network.

Aspects of the present disclosure provide apparatuses, methods, processing systems, and computer-readable mediums for performing various procedures by a UE that may be configured to operate in a bandwidth part (BWP) that may be reserved for UEs of a certain type, such as an initial downlink and uplink BWPs reserved for reduced capacity (RedCap) UEs.

Different types of UEs may have capabilities tailored to suit certain objectives. For example, some types of UEs may be designed to be scalable and deployable in a more efficient and cost-effective way than other types of UEs. These types of UEs may have reduced capabilities (RedCap) relative to conventional (more expensive) UEs, such as high-end smart phones. RedCap UEs may have relaxed latency and/or reliability requirements.

A network may configure separate frequency resources, referred to as bandwidth parts (BWPs) for RedCap UEs to perform certain functions, such as random access (RA) channel (RACH) procedures. In some cases, a RedCap UE may have only a single radio (e.g., to control cost), meaning it may be able to operate on only one BWP at a time. This may present certain challenges, however, as it may require the UE to retune its radio to receive certain types of signals used for certain purposes, which results in switching delay.

For example, the network may configure a RedCap UE with a downlink BWP (a DL BWP dedicated for RedCap UEs) that does not have certain signals transmitted therein. This DL BWP may be configured for the UE to perform certain idle or inactive mode procedures. However, this DL BWP may not be configured with certain DL signals which may present a challenge.

For example, in some cases, synchronization signal blocks (SSBs) may not be transmitted in an initial DL BWP. In such cases, a RedCap UE may need to perform BWP switching, to a conventional BWP used by both RedCap and non-RedCap UEs, to detect SSBs for various purposes. As an example, certain mobility procedures may require a UE to detect and/or measure an SSB and transmit a physical random access channel (PRACH) on the uplink thereafter.

Standard specifications may define timelines that mandate when the UE needs to transmit PRACH after detecting a condition that triggers a mobility procedure. Unfortunately, these timelines typically assume that SSBs are transmitted and detected in the same BWP that the PRACH is to be sent. Therefore, these timelines might not account for the additional delay a RedCap UE may incur if it needs to switch from a first BWP in which an SSB was detected to a second BWP for PRACH transmission. As a result, there is a risk the timelines may not be satisfied and the mobility procedure may not succeed.

Aspects of the present disclosure may help address this problem by effectively adjusting timelines for various mobility procedures in order to account for additional BWP switching time. The adjusted timelines may increase the likelihood that RedCap UE mobility procedures will succeed.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
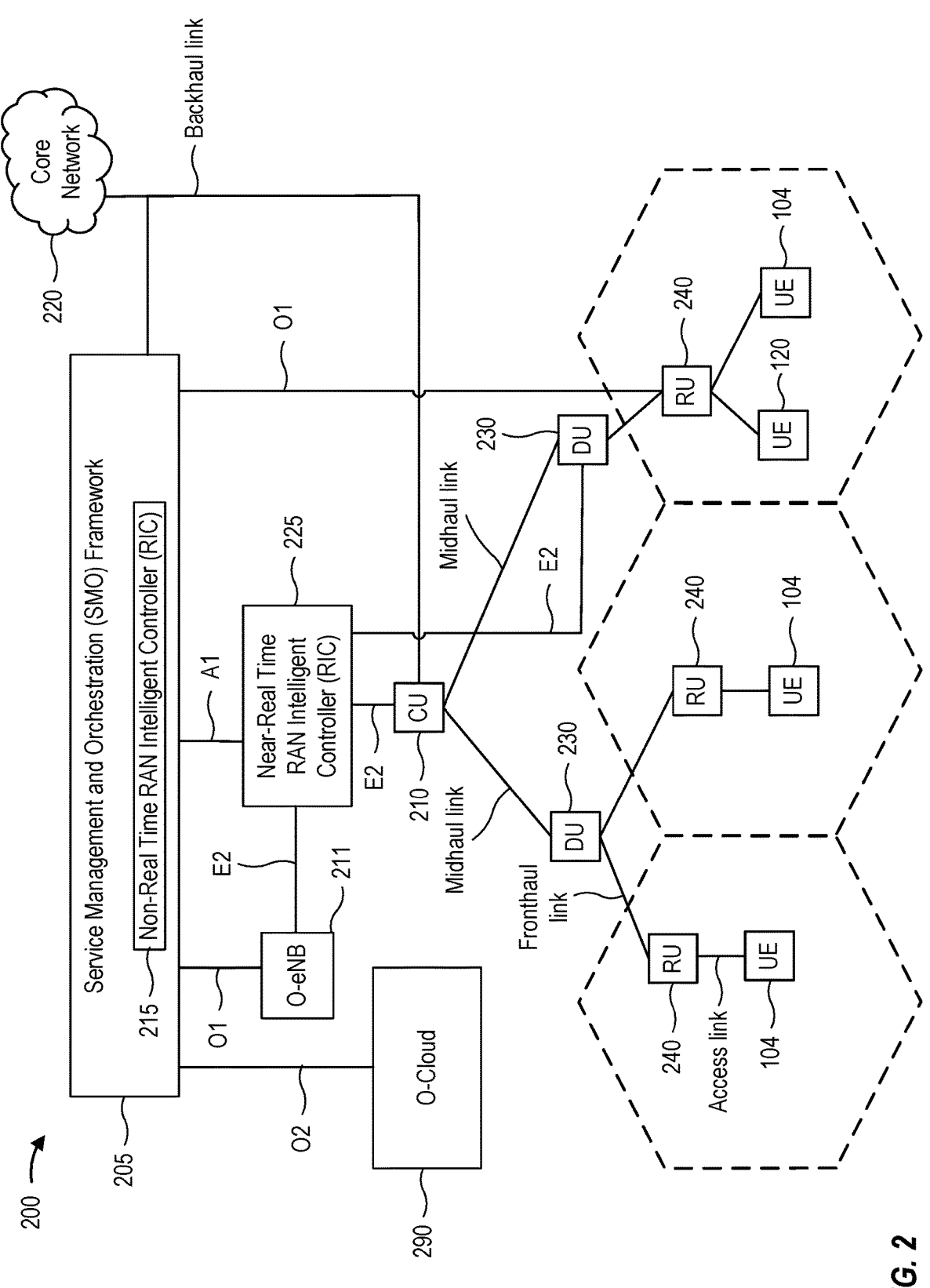
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
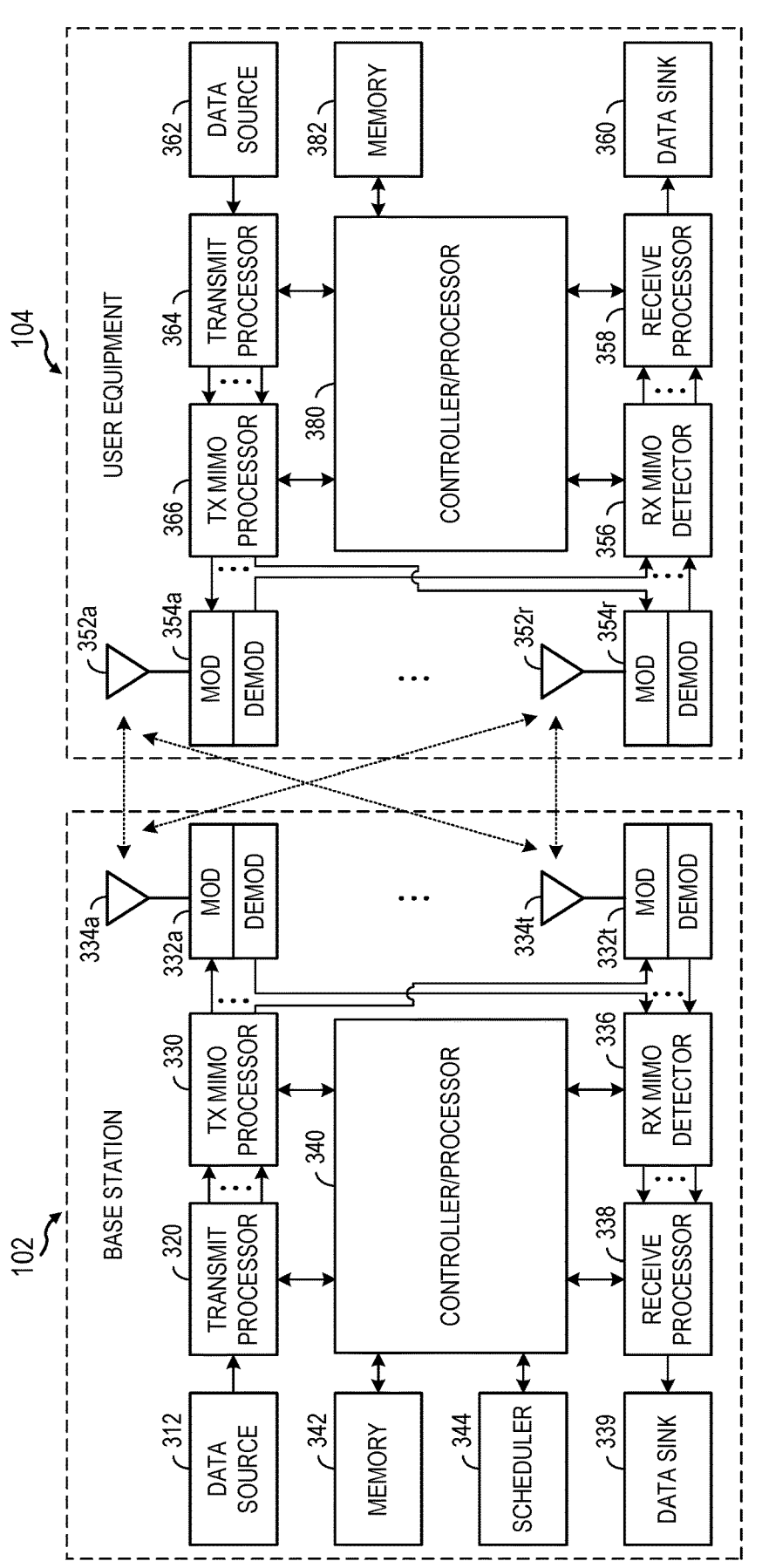
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

Figures 4A, 4B, 4C, 4D:
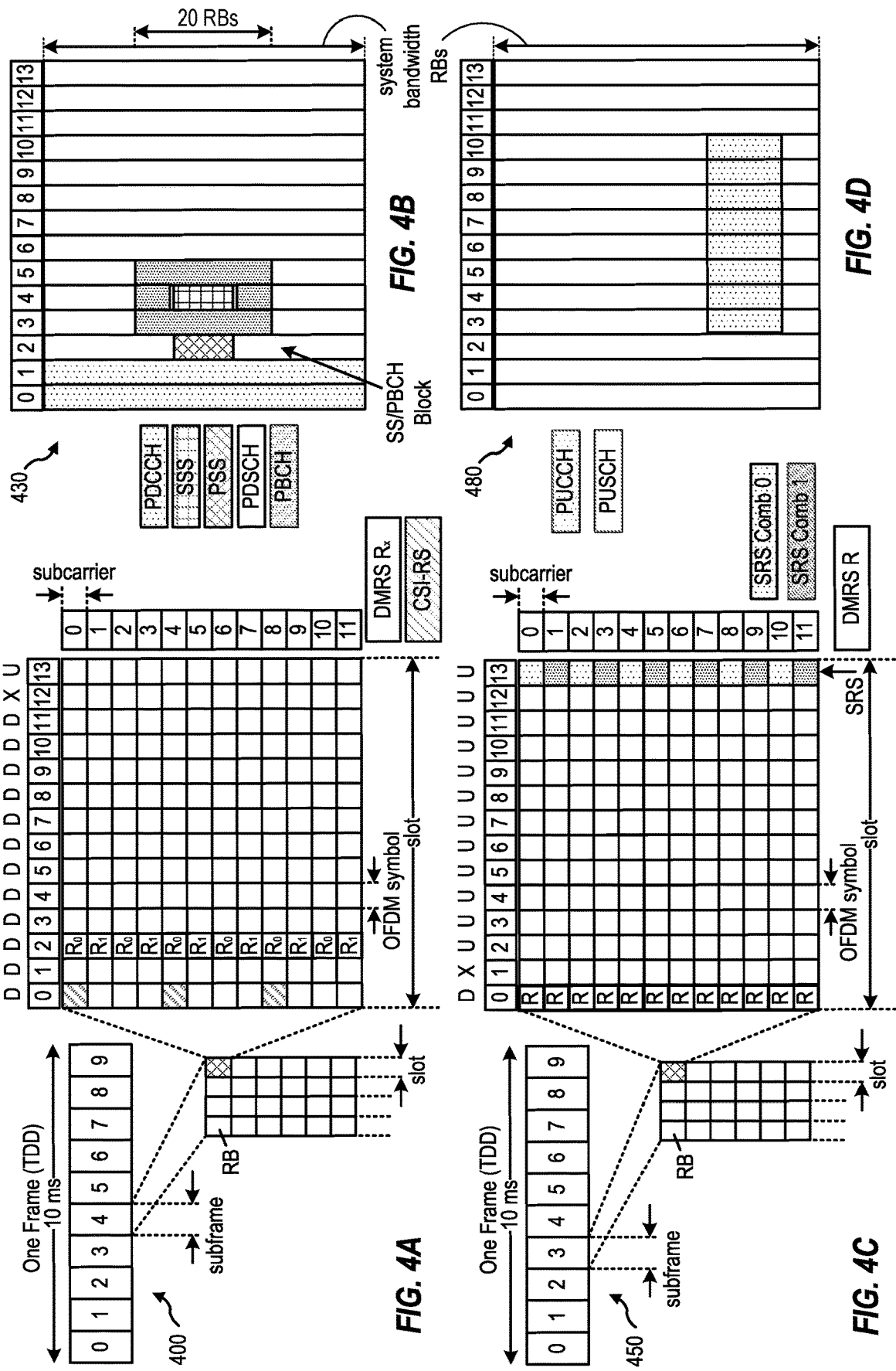
FIGS. 4A, 4B, 4C, and 4D depict various example aspects of data structures for a wireless communication network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Reduced Capability (RedCap) UE

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exist a strong desire for new radio (NR) to be scalable and deployable in a more efficient and cost-effective way. Thus, a new UE type with reduced capabilities (RedCap) has been introduced. RedCap UE may exhibit a relaxation of peak throughput (e.g., 20 MHz), as well as lower latency and/or reliability requirements. Also, the RedCap UE may involve lower device cost (and complexity) and improved efficiency (e.g. power consumption, system overhead, and cost improvements) as compared to high-end devices, such as high-end eMBB and URLCC devices of 5G NR Rel-15/16 (e.g., high-end smartphones). In some cases, a cell may allow access for a RedCap UE. A network can configure a separate initial UL BWP for RedCap UEs in a system information block (SIB) which may be used both during and after initial access. A RedCap UE may not be configured to support a BWP wider than the maximum bandwidth of the initial BWP for the RedCap UE; however, a non-RedCap UE, which may share an initial UL BWP with the RedCap UE, is allowed to exceed the maximum bandwidth of the initial BWP. The RedCap UE may switch to a non-initial BWP by using the BWP switching mechanisms as described in greater detail below.

For many use cases, a RedCap UE may be implemented with a device design having a more compact form factor. RedCap UEs may also support frequency range (FR) 1 and/or 2 bands for frequency division duplexed (FDD) and/or time division duplexed (TDD) communications. For F1, a basic BWP operation with restriction may be used as a starting point for RedCap UE capability. Alternatively, basic BWP operation without restriction may be used as a starting point for RedCap UE capability. For FR1 in TDD, center frequencies may be the same for the initial DL and UL BWPs used during random access for RedCap UEs. Center frequencies may be the same for a non-initial DL and UL BWPs with the same BWP identifier (BWP ID) for a RedCap UE.

Thus, some design objectives of the NR RedCap UE may include scalable resource allocation, coverage enhancement for DL and/or UL, power saving in all RRC states, and/or co-existence with the NR premium UE.

Figure 5:
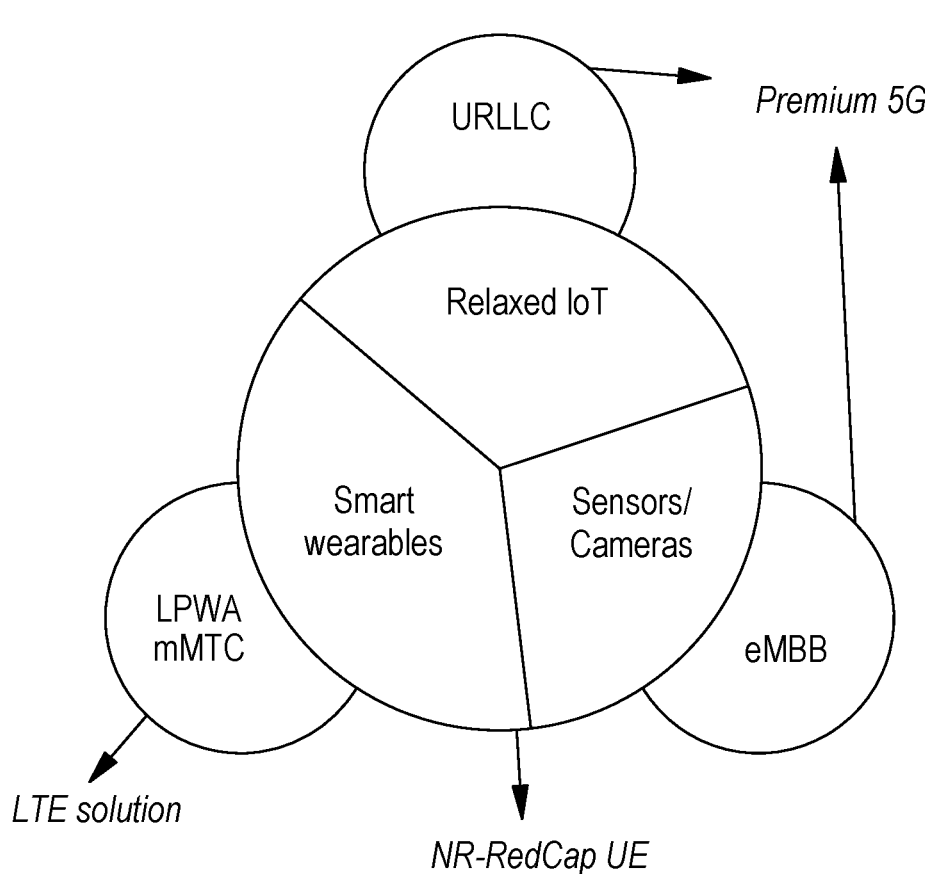
FIG. 5 depicts an example new radio (NR) reduced capability (RedCap) user equipment (UE).

As shown in the diagram 500 of FIG. 5, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 6B:
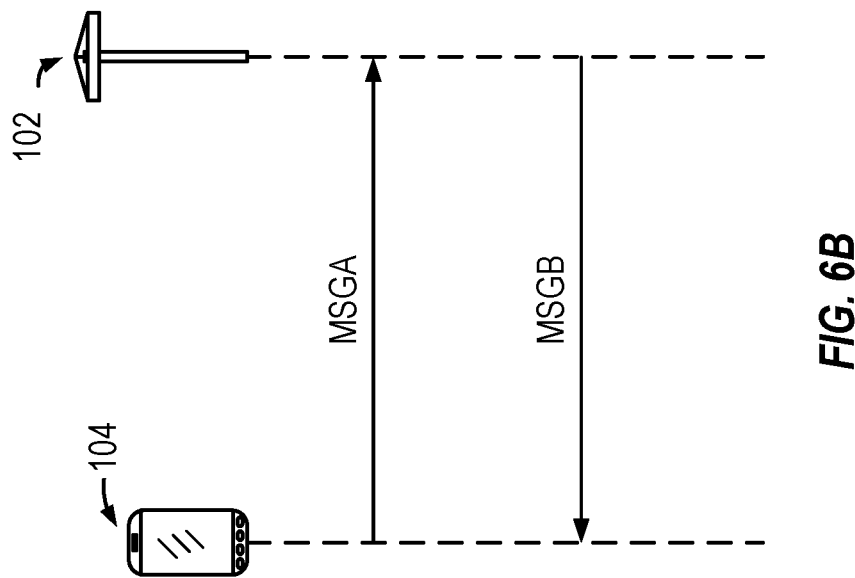
FIG. 6A and FIG. 6B depict call flow diagrams for 2-step and 4-step random access channel (RACH) procedures, respectively.
Figure 6A:
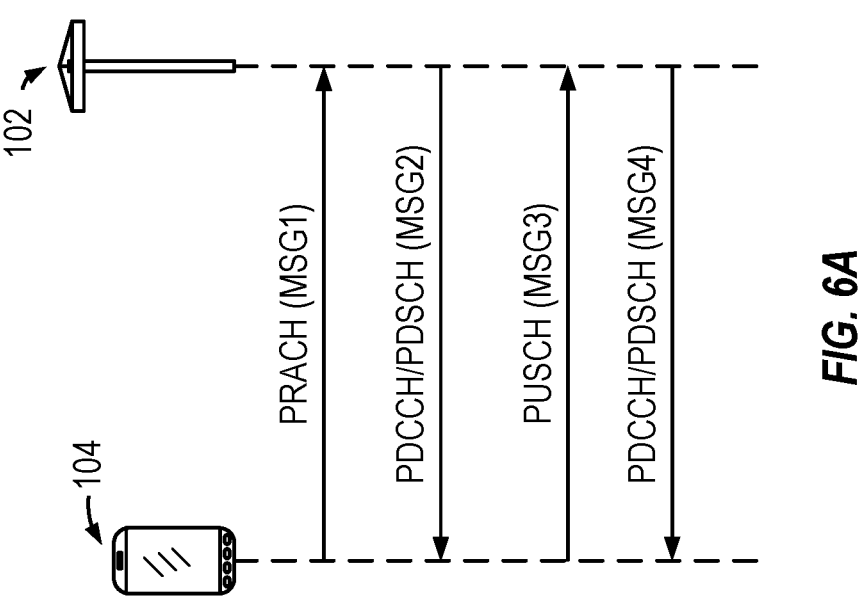

FIG. 6A is a timing (or "call-flow") diagram 600A illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble. BS 102 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 104 to BS 102 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

FIG. 6B is a call flow diagram 600B illustrating an example two-step RACH procedure, in accordance with certain aspects of the present disclosure. A first enhanced message (msgA) may be sent from the UE 104 to BS 102. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 102 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:

(1) selection of a preamble sequence; and
(2) selection of a preamble occasion in time/frequency
   domain (for transmitting the selected preamble
   sequence).

The msgA payload transmission generally involves:
(1) construction of the random access message payload
   (DMRS/PUSCH); and
(2) selection of one or multiple PUSCH resource units
   (PRUs) in time/frequency domain to transmit this mes-
   sage (payload).

In some cases, a UE monitors SSB transmissions which are sent (by a gNB using different beams) and are associated with a finite set of time/frequency resources defining RACH occasions (ROs) and PRUs. Upon detecting an SSB, the UE may select an RO and one or more PRUs associated with that SSB for a MSG1/msgA transmission. In some cases, a RO associated with the detected SSB falls within a RedCap UE bandwidth, and the RedCap UE may utilize a separate initial UL BWP for RedCap (which is not expected to exceed the maximum RedCap UE bandwidth) which may include ROs for RedCap UEs. ROs may be dedicated for RedCap UEs or shared with non-RedCap UEs. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Figure 7:
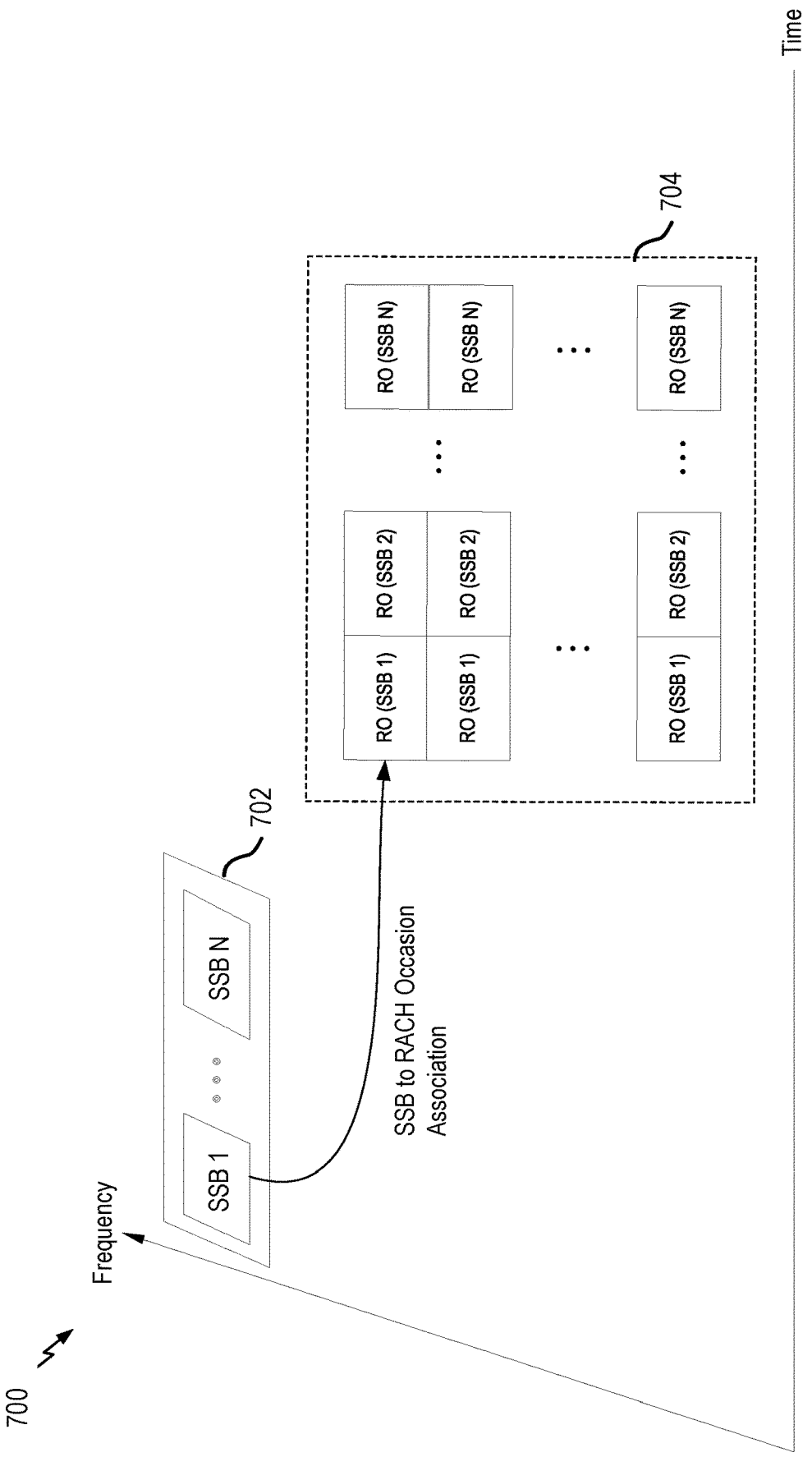
FIG. 7 illustrates an example association of SSBs to RACH occasions (ROs).

After a UE has selected an SSB (associated with a given beam), for that SS block there are one or more predefined ROs with certain time and frequency offset and direction (e.g., specific to the selected SSB). FIG. 7 illustrates an example association (mapping) between SSBs 702 and ROs 704.

This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

In some cases, SSBs/beams detected in one BWP may be mapped to ROs in another BWP. In such cases, aspects of the present disclosure may adjust PRACH related timing to account for BWP switching (e.g., extending a timeline in which the UE is expected to transmit a PRACH to account for additional BWP switching delay).

Overview of Dedicated RedCap BWPs

Figure 8:
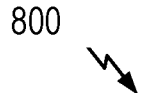
FIG. 8 illustrates example features for RedCap and non-RedCap bandwidth parts (BWPs).

Due to differences in capability, RedCap UEs (due to their low bandwidth capability) and conventional (e.g., non-RedCap or Legacy) UEs may be configured to operate in bandwidth parts (BWPs) with different features. The table 800 in FIG. 8 summarizes some of the different features. For example, a conventional, non-RedCap initial downlink (DL) BWP may contain SSBs, RACH common search space (CSS) and CORESET0. As illustrated in FIG. 8, RedCap initial DL BWP may contain, for example, the RACH CSS, but may not contain SSBs, CORESETs (e.g., CORESET0, CORESET for paging), and/or system information blocks (SIB). In other cases, a RedCap UE may not contain the RACH CSS, but may contain CORESETs (e.g., CORE-SET0). Similarly, the RedCap non-initial DL BWP may not contain SSB or system information, and may be unable to access this information.

Figure 9A:
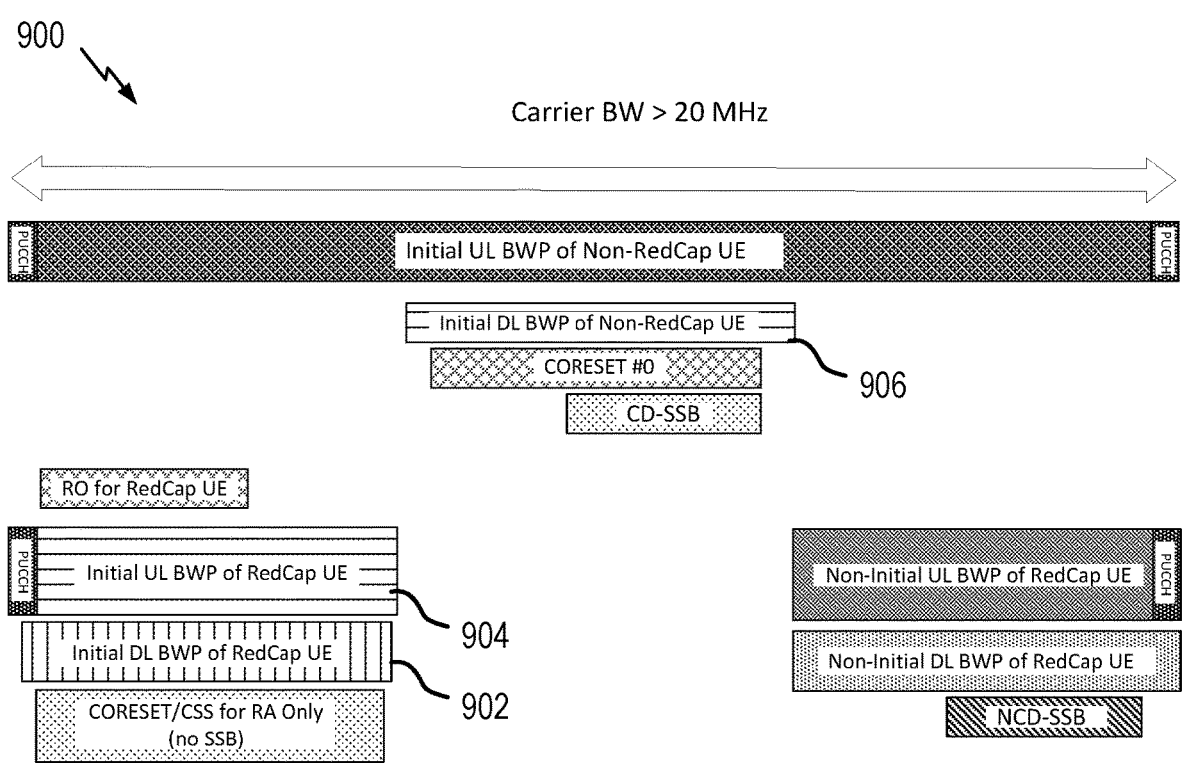
FIG. 9A and FIG. 9B depict example bandwidth part (BWP) configurations for RedCap and non-RedCap UEs, in accordance with aspects of the present disclosure.
Figure 9B:
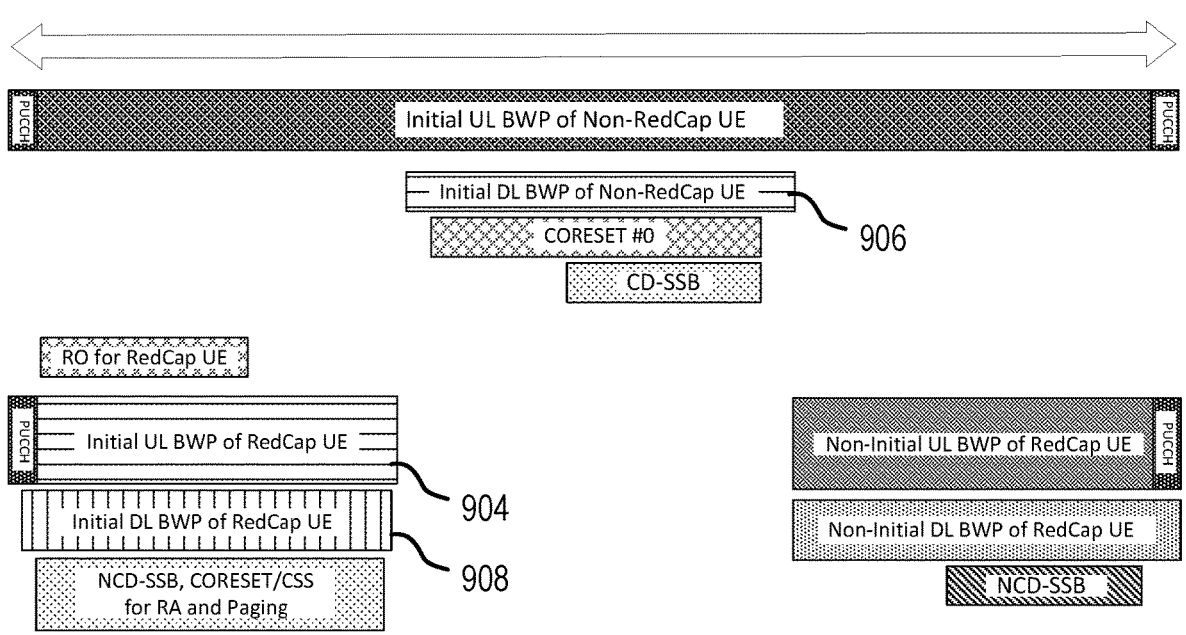

As illustrated in FIGS. 9A and 9B, RedCap specific initial downlink (DL) BWP 902 and uplink (UL) BWP 904 may be configured. Certain standard specifications may allow for up to one separate initial UL BWP for RedCap to be configured. For a cell that allows access to a RedCap UE, the network can configure a separate initial DL BWP for RedCap UEs (this configuration may be via SIB, separate from the MIB configured CORESET #0 BWP).

As illustrated in FIG. 9A, in FR1, a separate initial DL BWP may be configured that does not include cell defining SSBs (CD-SSB) and does not contain the entire CORESET #0. In the illustrated example, the initial DL BWP is configured for random access but not for paging in idle/inactive mode. In this case, the RedCap UE does not expect the initial DL BWP to contain SSB/CORESET #0/SIB.

In general, it may be assumed that a RedCap UE performing random access in the separate DL BWP does not need to monitor paging in a BWP 906 containing CORESET #0. On the other hand, as illustrated in FIG. 9B, if the initial DL BWP 908 is configured for paging (and random access), the RedCap UE may expect the initial DL BWP to contain non cell-defining SSBs (NCD-SSBs) for the serving cell, but not CORESET #0/SIB.

Aspects Related to RedCap Mobility Procedure Timelines

Aspects of the present disclosure provide apparatuses, methods, processing systems, and computer-readable mediums for effectively adjusting timelines for various mobility procedures in order to account for additional BWP switching time. For example, the timelines may be adjusted to account for the additional time a RedCap UE incurs when switching from a first BWP in which it detects an SSB to a second BWP in which it transmits a physical random access channel (PRACH).

As will be described in greater detail below, according to certain aspects of the present disclosure, a timeline adjustment may effectively relax timing requirements to allow for a radio resource control (RRC) reestablishment delay with RedCap specific initial BWP. For example, when a Redcap specific initial BWP is configured for random access (RA), an RRC connection release time may be extended with a BWP switching (re-direction) delay by some amount (e.g., X ms).

While examples herein make reference to RedCap UEs, the techniques may generally be applied to any type of UE that has different capabilities than other UEs. In such cases, different UEs may be configured with different types of BWPs and may incur BWP switching delays, as described herein with reference to RedCap UEs.

As noted above, certain mobility procedures require a UE to detect and/or measure an SSB and, after the detection/measurement, transmit a PRACH on an uplink. Examples of such mobility procedures include handover, RRC Re-establishment, or RRC Connection release with re-direction procedures. The techniques described herein, however, may also be applied for various other procedures that are impacted by BWP switching, such as small data transfer (SDT) or paging/SI update procedures involving multiple BWPs. For example, in such cases, an indication may be provided in one BWP, while data delivery occurs in another BWP.

As noted above, conventional systems (e.g., so called "legacy" NR systems Rel 15/16/17) may assume SSBs are always present in the initial BWP. When the Redcap specific initial DL BWP is configured for RA only (and not paging), however, the initial DL BWP may not contain a (CD or NCD) SSB.

According to aspects of the present disclosure, a UE (e.g., a RedCap UE) may perform the following sequence of operations, illustrated in the timeline 1000 of FIG. 10, when an initial BWP (e.g., a RedCap specific initial BWP 1002) is configured for RA only.

As illustrated, the UE may first receive (detect and/or measure) an SSB in the non-Redcap specific initial DL BWP 1002. The UE may then obtain a system information block (SIB), based on the SIB. The UE may then perform a BWP switch to the RedCap specific initial BWP. After the BWP switch, which has a BWP switching delay ($T_{BWP\text{-}switching\text{-}delay}$) 1006, the UE may then perform a random access procedure in the RedCap specific initial (DL and UL) BWP 1004. This random access procedure begins with a PRACH transmission.

Aspects of the present disclosure allow mobility procedure delays (timelines) to be adjusted to accommodate additional BWP switching time needed by certain UEs. The mobility procedure delays may be designed to ensure that excess latency is not occurred. In other words, if a PRACH is not transmitted in the expected time, the network may cease to monitor. PRACH monitoring occasions may, thus, be designed based on this expected timeline. The techniques proposed herein may relax these timelines for UEs that need to perform BWP switching, such as RedCap UEs. Exactly how the timelines are determined and adjusted may depend on the particular mobility procedure.

For example, for a handover procedure, standards may dictate that a UE should be ready to start transmission of the new uplink PRACH channel after a triggering condition. For example, the UE may be expected to transmit PRACH within a delay specified by a parameter $D_{handover}$ (in ms) from an end of the last transmission time interval (TTI) containing an RRC command triggering the handover.

$D_{handover}$ typically corresponds to a maximum RRC procedure delay, defined in a standard, plus an additional interruption time, $T_{interrupt}$. This interruption time, $T_{interrupt}$, generally corresponds to the time between the end of the last TTI containing the RRC command (e.g., conveyed via a PDSCH) and the time the UE starts transmission of the new PRACH, excluding the RRC procedure delay. $T_{interrupt}$ may be defined as:

$$T_{interrupt}=T_{search}+T_{IU}+T_{processing}+T_{\Delta}+T_{margin} \text{ ms,}$$

where $T_{search}$ is the time required to search for the target cell when the target cell is not already known when the handover command is received by the UE, $T_A$ is a time for fine time tracking and acquiring full timing information of the target cell, $T_{processing}$ is time for UE processing (e.g., and can be up to 20 ms), $T_{margin}$ is time for SSB post-processing (e.g., and can be up to 2 ms), $T_A$ is time for fine time tracking and acquiring full timing information of the target cell, and $T_{IU}$ is the interruption uncertainty in acquiring the first available PRACH occasion in the new cell. Aspects of the present disclosure propose adjusting the handover timeline by adjusting $T_{interrupt}$ when a RedCap specific initial BWP is configured for RA only, and there is no SSB available in the RedCap specific initial BWP, as follows:

$$T_{interrupt}=T_{search}+T_{IU}+T_{processing}+T_{\Delta}+T_{margin}+ \\ T_{BWP\text{-}switching\text{-}delay} \text{ (ms),}$$

where $T_{BWP\text{-}switching\text{-}delay}$ represents the BWP switching delay from a non-RedCap specific initial BWP to a Redcap specific initial BWP, as shown in FIG. 10.

For RRC re-establishment, standards may define a UE re-establishment delay ($T_{UE\_re\text{-}establish\_delay}$) that represents the time between the when any one of the conditions requiring RRC re-establishment (e.g., as defined in standards such as radio link failure, handover failure, etc) is detected by the UE and when the UE sends PRACH to the target PCell. The UE re-establishment delay ($T_{UE\_re\text{-}establish\_delay}$) may be expected to be less than:

$$T_{UE\_re\text{-}establish\_delay}=50 \quad \text{ms}+T_{identify\_intra\_NR}+ \\ \sum_{i=1}^{Nfreq-1}T_{identify\_inter\_NR,i}+T_{SI\text{-}NR}+T_{PRACH},$$

where $T_{identify\_intra\_NR}$ is the time to identify the target intra-frequency NR cell (which generally depends on whether the target NR cell is known cell or unknown cell and on the FR of the target NR cell), $T_{identify\_inter\_NR,i}$ is the time to identify the target inter-frequency NR cell on inter-frequency carrier i (configured for RRC re-establishment and generally depends on whether the target NR cell is known cell or unknown cell and on the FR of the target NR cell), $T_{SI\text{-}NR}$ is the time for receiving the relevant system information according to the reception procedure and the RRC procedure delay of system information blocks for the target PCell, $T_{PRACH}$ is the delay caused due to the random access procedure when sending random access to the target NR cell (and generally depends on the PRACH configuration), and $N_{freq}$ is the total number of NR frequencies to be monitored for RRC re-establishment (e.g., Nfreq=1 if the target PCell is known). Aspects of the present disclosure propose adjusting the UE re-establishment delay, when the Redcap specific initial BWP is configured for RA only, and there is no SSB available in the RedCap specific initial BWP, as follows:

$$T_{UE\_re\text{-}establish\_delay} = 50 \text{ ms} + T_{identify\_intra\_NR} + \\ \sum_{i=1}^{Nfreq-1}T_{identify\_inter\_NR,i} + T_{SI\text{-}NR} + T_{PRACH} + T_{BWP\text{-}switching\text{-}delay} \text{ ms}$$

where $T_{BWP\text{-}switching\text{-}delay}$ is the BWP switching delay from non-Redcap specific initial BWP to Redcap specific initial BWP, as shown in FIG. 10.

For RRC Re-establishment, standards may define a time delay ($T_{connection\_release\_redirect\_NR}$) that represents the time between the end of the last slot containing the RRC command (e.g., "RRCRelease") on the NR PDSCH and the time the UE is to start to send random access to the target NR cell. The time delay ($T_{connection\_release\_redirect\_NR}$) is expected to be less than:

$$T_{connection\_release\_redirect\_NR}=T_{RRC\_procedure\_delay}+ \\ T_{identify\text{-}NR}+T_{SI\text{-}NR}+T_{RACH},$$

where $T_{RRC\_procedure\_delay}$ is the RRC procedure delay for processing the received message (RRCConnectionRelease), $T_{identify\text{-}NR}$ is the time to identify the target NR cell (which depends on the FR of the target NR cell), and $T_{RACH}$ is the delay caused due to the random access procedure when sending random access to the target NR cell (and generally depends on the PRACH configuration). Aspects of the present disclosure propose adjusting the RRC connection release with redirection delay, when the RedCap specific initial BWP is configured for RA only, and there is no SSB available in the RedCap specific initial BWP as follows:

$$T_{connection\_release\_redirect\_NR}=T_{RRC\_procedure\_delay}+ \\ T_{identify\text{-}NR}+T_{SI\text{-}NR}+T_{RACH}+T_{BWP\text{-}switching\text{-}delay},$$

where $T_{BWP\text{-}switching\text{-}delay}$ is the BWP switching delay from non-Redcap specific initial BWP to Redcap specific initial BWP.

The additional BWP switching times proposed herein may have various properties and may be conveyed in various manners. For example, additional BWP switching times described above may be set to values corresponding to an RRC based BWP switching time (e.g., 6 ms) or the DCI based BWP switching times of legacy (non-Redcap) NR UEs.

In some cases, the additional BWP switching times may depend on one or more properties of various channels or signals. For example, the additional BWP switching times may depend on subcarrier spacing (SCS) and frequency ranges, according to one or of the following combinations:
    SCS and frequency range of PDSCH conveying handover command of serving cell;
    SCS and frequency range of SSB of target cell;
    SCS and frequency range of PRACH of target cell; or
    SCS and frequency range of RACH common search space of target cell.

Aspects of the present disclosure may help address the challenges presented by RedCap specific BWPs by effectively adjusting timelines for various mobility procedures in order to account for additional BWP switching time. The adjusted timelines may increase the likelihood that RedCap UE mobility procedures will succeed, which may help improve performance and conserve power.

Example Operations of a User Equipment

FIG. 11 shows a method 1100 for wireless communication by a UE, such as UE 104 of FIGS. 1 and 3.

Method 1100 begins at 1105 with detecting, in a first BWP, a condition triggering a mobility procedure that involves a PRACH transmission in a second BWP. In some cases, the operations of this step refer to, or may be performed by, mobility procedure circuitry as described with reference to FIG. 12.

Method 1100 then proceeds to step 1110 with determining a timeline for transmitting the PRACH in the second BWP, based on a mobility procedure delay that accounts for BWP switching time for switching from the first BWP to the second BWP. In some cases, the operations of this step refer to, or may be performed by, PRACH timing circuitry as described with reference to FIG. 12.

Method 1100 then proceeds to step 1115 with transmitting the PRACH in the second BWP in accordance with the timeline. In some cases, the operations of this step refer to, or may be performed by, PRACH transmission circuitry as described with reference to FIG. 12.

Various aspects relate to the method 1100, including the following aspects.

In some aspects, the UE is a UE of a first type having a first set of capabilities, the first BWP is configured for common use by UEs of the first type and UEs of a second type having a second set of capabilities, and the second BWP is configured for dedicated use by UEs of the first type.

In some aspects, the mobility procedure comprises a handover. In some aspects, the mobility procedure delay comprises a delay between a RRC message triggering the handover, received in the first BWP, and transmission of the PRACH in the second BWP.

In some aspects, the mobility procedure comprises a RRC re-establishment procedure. In some aspects, the mobility procedure delay comprises a delay between a condition triggering RRC re-establishment, detected in the first BWP, and transmission of the PRACH in the second BWP. In some aspects, the mobility procedure comprises a RRC release with re-direction procedure. In some aspects, the mobility procedure delay comprises a delay between an RRC release command, received in the first BWP, and transmission of the PRACH in the second BWP.

In some aspects, the mobility procedure delay is based on a RRC based BWP switching time or a DCI based switching time. In some aspects, the mobility procedure delay is based on a BWP switching time that depends on at least one of: a SCS and frequency range of a PDSCH conveying a handover command of a serving cell; an SCS and frequency range of a SSB of a target cell; an SCS and frequency range of a PRACH of the target cell; or an SCS and frequency range of a RACH common search space of the target cell.

Figure 12:
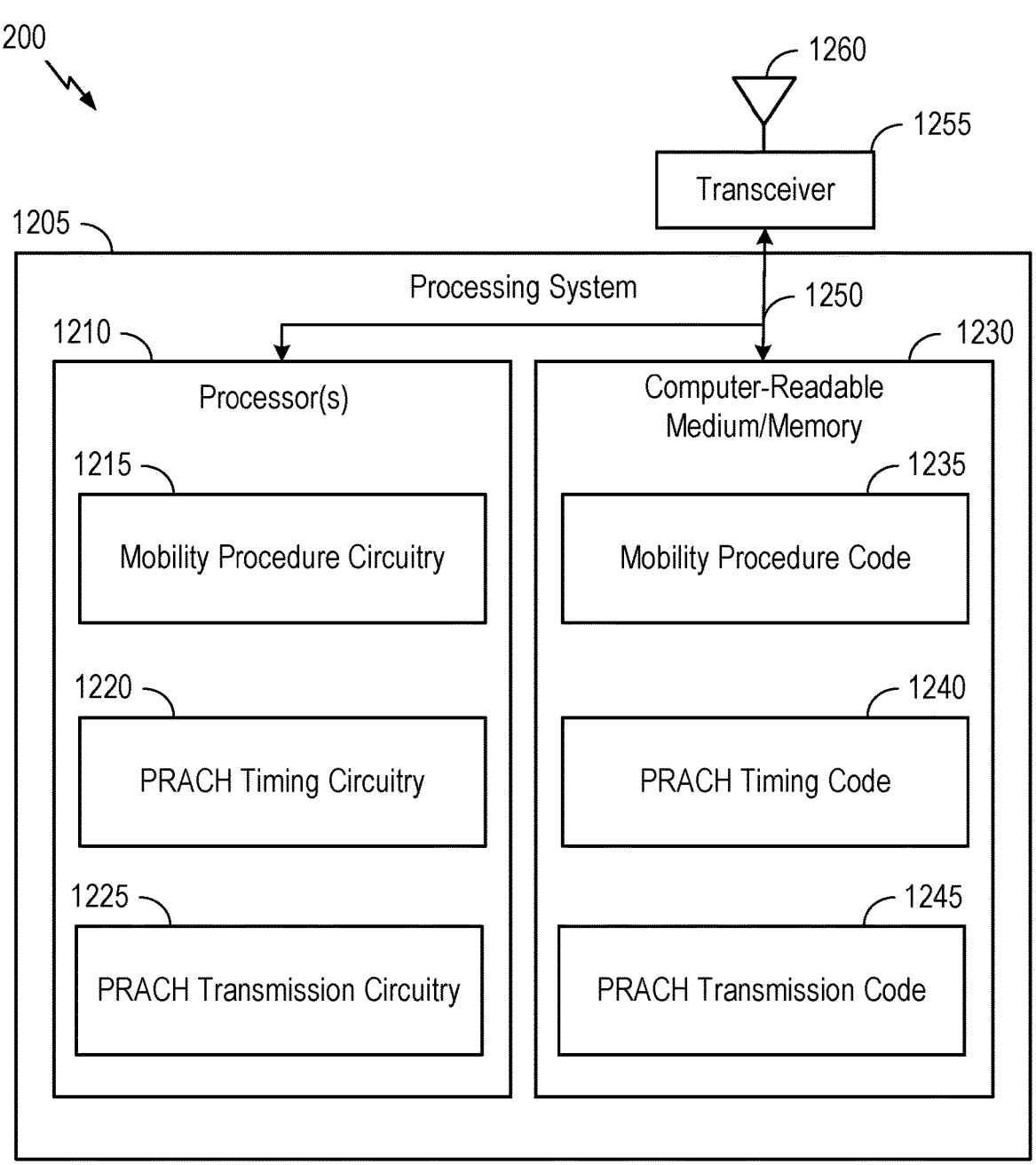
FIG. 12 depicts aspects of an example communications device.

In one aspect, method 1100, or any aspect related to it, may be performed by an apparatus, such as communications device 1200 of FIG. 12, which includes various components operable, configured, or adapted to perform the method 1100. Communications device 1200 is described below in further detail.

Note that FIG. 11 is just one example of a method, and other methods including fewer, additional, or alternative steps are possible consistent with this disclosure.

Example Communications Device

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to the transceiver 1255 (e.g., a transmitter and/or a receiver). The transceiver 1255 is configured to transmit and receive signals for the communications device 1200 via the antenna 1260, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1230 via a bus 1250. In certain aspects, the computer-readable medium/memory 1230 is configured to store instructions (e.g., computer-executable code) that when executed by the one or more processors 1210, cause the one or more processors 1210 to perform the method 1100 described with respect to FIG. 11, or any aspect related to it. Note that reference to a processor performing a function of communications device 1200 may include one or more processors 1210 performing that function of communications device 1200.

In the depicted example, computer-readable medium/memory 1230 stores code (e.g., executable instructions), such as mobility procedure code 1235, PRACH timing code 1240, and PRACH transmission code 1245. Processing of the mobility procedure code 1235, PRACH timing code 1240, and PRACH transmission code 1245 may cause the communications device 1200 to perform the method 1100 described with respect to FIG. 11, or any aspect related to it.

The one or more processors 1210 include circuitry configured to implement (e.g., execute) the code stored in the computer-readable medium/memory 1230, including circuitry such as mobility procedure circuitry 1215, PRACH timing circuitry 1220, and PRACH transmission circuitry 1225. Processing with mobility procedure circuitry 1215, PRACH timing circuitry 1220, and PRACH transmission circuitry 1225 may cause the communications device 1200 to perform the method 1100 described with respect to FIG. 11, or any aspect related to it.

Various components of the communications device 1200 may provide means for performing the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1255 and the antenna 1260 of the communications device 1200 in FIG. 12. Means for receiving or obtaining may include transceivers 354 and/or antenna(s) 352 of the UE 104 illustrated in FIG. 3 and/or the transceiver 1255 and the antenna 1260 of the communications device 1200 in FIG. 12.

According to some aspects, mobility procedure circuitry 1215 detects, in a first BWP, a condition triggering a mobility procedure that involves a PRACH transmission in a second BWP. According to some aspects, PRACH timing circuitry 1220 determines a timeline for transmitting the PRACH in the second BWP, based on a mobility procedure delay that accounts for BWP switching time for switching from the first BWP to the second BWP. According to some aspects, PRACH transmission circuitry 1225 transmits the PRACH in the second BWP in accordance with the timeline.

In some aspects, the UE is a UE of a first type having a first set of capabilities, the first BWP is configured for common use by UEs of the first type and UEs of a second type having a second set of capabilities, and the second BWP is configured for dedicated use by UEs of the first type. In some aspects, the mobility procedure comprises a handover. In some aspects, the mobility procedure delay comprises a delay between a RRC message triggering the handover, received in the first BWP, and transmission of the PRACH in the second BWP. In some aspects, the mobility procedure comprises a RRC re-establishment procedure. In some aspects, the mobility procedure delay comprises a delay between a condition triggering RRC re-establishment, detected in the first BWP, and transmission of the PRACH in the second BWP. In some aspects, the mobility procedure comprises a RRC release with re-direction procedure. In some aspects, the mobility procedure delay comprises a delay between an RRC release command, received in the first BWP, and transmission of the PRACH in the second BWP. In some aspects, the mobility procedure delay is based on a RRC based BWP switching time or a DCI based switching time. In some aspects, the mobility procedure delay is based on a BWP switching time that depends on at least one of: a SCS and frequency range of a PDSCH conveying a handover command of a serving cell; an SCS and frequency range of a SSB of a target cell; an SCS and frequency range of a PRACH of the target cell; or an SCS and frequency range of a RACH common search space of the target cell.

Example Clauses

Implementation examples are described in the following numbered clauses:

Clause 1: A method for wireless communication by a UE, comprising: detecting, in a first BWP, a condition triggering a mobility procedure that involves a PRACH transmission in a second BWP; determining a timeline for transmitting the PRACH in the second BWP, based on a mobility procedure delay that accounts for BWP switching time for switching from the first BWP to the second BWP; and transmitting the PRACH in the second BWP in accordance with the timeline.

Clause 2: The method of Clause 1, wherein: the UE is a UE of a first type having a first set of capabilities; the first BWP is configured for common use by UEs of the first type and UEs of a second type having a second set of capabilities; and the second BWP is configured for dedicated use by UEs of the first type.

Clause 3: The method of any one of Clauses 1 and 2, wherein the mobility procedure comprises a handover.

Clause 4: The method of Clause 3, wherein the mobility procedure delay comprises a delay between a RRC message triggering the handover, received in the first BWP, and transmission of the PRACH in the second BWP.

Clause 5: The method of any one of Clauses 1-4, wherein the mobility procedure comprises a RRC re-establishment procedure.

Clause 6: The method of Clause 5, wherein the mobility procedure delay comprises a delay between a condition triggering RRC re-establishment, detected in the first BWP, and transmission of the PRACH in the second BWP.

Clause 7: The method of any one of Clauses 1-6, wherein the mobility procedure comprises a RRC release with re-direction procedure.

Clause 8: The method of Clause 7, wherein the mobility procedure delay comprises a delay between an RRC release command, received in the first BWP, and transmission of the PRACH in the second BWP.

Clause 9: The method of any one of Clauses 1-8, wherein the mobility procedure delay is based on a RRC based BWP switching time or a DCI based switching time.

Clause 10: The method of any one of Clauses 1-9, wherein the mobility procedure delay is based on a BWP switching time that depends on at least one of: a SCS and frequency range of a PDSCH conveying a handover command of a serving cell; an SCS and frequency range of a SSB of a target cell; an SCS and frequency range of a PRACH of the target cell; or an SCS and frequency range of a RACH common search space of the target cell.

Clause 11: A processing system, comprising: a memory comprising computer-executable instructions; one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE) of a first type, the method comprising:
  detecting, in a first bandwidth part (BWP), (i) a condition triggering a radio resource control (RRC) re-establishment procedure or (ii) reception of a RRC release with redirection command;
  determining a delay between (i) the detection of the condition triggering the RRC re-establishment procedure or the reception of the RRC release with redirection command and (ii) transmission of a physical random access channel (PRACH) in a second BWP dedicated for use by UEs of the first type, wherein the determination of the delay is based on a BWP switching time for switching from the first BWP to the second BWP; and
  transmitting the PRACH transmission in the second BWP in accordance with the delay.

2. The method of claim 1, wherein:
  the UE is a UE of a first type of UEs comprises UEs having a reduced set of capabilities; and
  the first BWP is configured for common use by UEs of the first type and UEs of a second type having a second set of capabilities larger than the reduced set of capabilities.

3. The method of claim 1, further comprising receiving a RRC message including a handover command in the first BWP.

4. The method of claim 3, further comprising determining a delay between RRC message and transmission of the PRACH transmission in the second BWP dedicated for use by the UEs of the first type.

5. The method of claim 1, wherein the detecting comprises detecting the condition triggering RRC re-establishment procedure in the first BWP.

6. The method of claim 5, wherein the delay comprises the delay between the detection of the condition triggering the RRC re-establishment and the transmission of the PRACH in the second BWP dedicated for use by the UEs of the first type.

7. The method of claim 1, wherein the detecting comprises detecting the reception of RRC release with redirection command in the first BWP.

8. The method of claim 7, wherein the delay comprises the delay between the reception of the RRC release with redirection command and the transmission of the PRACH in the second BWP dedicated for use by the UEs of the first type.

9. The method of claim 1, wherein the BWP switching time for switching from the first BWP to the second BWP dedicated for use by the UEs of the first type is an RRC based BWP switching time.

10. The method of claim 9, wherein the RRC based BWP switching time is 6 ms.

11. The method of claim 1, wherein the BWP switching time depends on at least one of:
  a subcarrier spacing (SCS) and frequency range of a physical downlink shared channel (PDSCH) conveying a handover command of a serving cell;
  an SCS and frequency range of a synchronization signal block (SSB) of a target cell;
  an SCS and frequency range of a PRACH of the target cell; or
  an SCS and frequency range of a random access channel (RACH common search space of the target cell.

12. An apparatus for wireless communication at a user equipment (UE) of a first type, comprising:
  a memory comprising computer-executable instructions; and
  one or more processors configured to, individually or collectively, execute the computer-executable instructions and cause the apparatus to:
    detect, in a first bandwidth part (BWP), (i) a condition triggering a radio resource control (RRC) re-establishment procedure or (ii) reception of a RRC release with redirection command;

determine a delay between (i) the detection of the condition triggering the RRC re-establishment procedure or the reception of the RRC release with redirection command and (ii) transmission of a physical random access channel (PRACH) in a second BWP dedicated for use by UEs of the first type, wherein the determination of the delay is based on a BWP switching time for switching from the first BWP to the second BWP; and transmit the PRACH transmission in the second BWP in accordance with the delay.

13. The apparatus of claim 12, wherein:

the UE is a UE of a first type of UEs comprises UEs having a reduced set of capabilities; and the first BWP is configured for common use by UEs of the first type and UEs of a second type having a second set of capabilities larger than the reduced set of capabilities.

14. The apparatus of claim 12, wherein the one or more processors are configured to, individually or collectively, execute the computer-executable instructions and further cause the apparatus to receive a RRC message including a handover command in the first BWP.

15. The apparatus of claim 14, wherein the one or more processors are configured to, individually or collectively, execute the computer-executable instructions and further cause the apparatus to determine a delay between RRC message and transmission of the PRACH transmission in the second BWP dedicated for use by the UEs of the first type.

16. The apparatus of claim 12, wherein the detecting comprises detecting the condition triggering the RRC re-establishment procedure in the first BWP.

17. The apparatus of claim 16, wherein the delay comprises the delay between the detection of the condition triggering the RRC re-establishment procedure and the transmission of the PRACH in the second BWP dedicated for use by the UEs of the first type.

18. The apparatus of claim 12, wherein the detecting comprises detecting the reception of RRC release with re-direction command in the first BWP.

19. The apparatus of claim 18, wherein the delay comprises the delay between the reception of the RRC release with re-direction command and the transmission of the PRACH in the second BWP dedicated for use by the UEs of the first type.

20. The apparatus of claim 12, wherein the BWP switching time for switching from the first BWP to the second BWP dedicated for use by the UEs of the first type is an RRC based BWP switching time.

21. The apparatus of claim 20, wherein the RRC based BWP switching time is 6 ms.

22. The apparatus of claim 12, wherein the BWP switching time depends on at least one of:

a subcarrier spacing (SCS) and frequency range of a physical downlink shared channel (PDSCH) conveying a handover command of a serving cell;

an SCS and frequency range of a synchronization signal block (SSB) of a target cell;

an SCS and frequency range of a PRACH of the target cell; or an SCS and frequency range of a RACH common search space of the target cell.

23. An apparatus for wireless communications at a user equipment (UE) of a first type, the apparatus comprising:

means for detecting, in a first bandwidth part (BWP), (i) a condition triggering a radio resource control (RRC) re-establishment procedure or (ii) reception of a RRC release with redirection command;

means for determining a delay between (i) the detection of the condition triggering the RRC re-establishment procedure or the reception of the RRC release with redirection command and (ii) transmission of a physical random access channel (PRACH) in a second BWP dedicated for use by UEs of the first type, wherein the determination of the delay is based on a BWP switching time for switching from the first BWP to the second BWP; and means for transmitting the PRACH transmission in the second BWP in accordance with the delay.

24. A non-transitory computer-readable medium comprising computer-executable instructions that, when executed by one or more processors of a user equipment (UE) of a first type, cause the UE to perform a method of wireless communication, the method comprising:

detecting, in a first bandwidth part (BWP), (i) a condition triggering a radio resource control (RRC) re-establishment procedure or (ii) reception of a RRC release with redirection command;

determining a delay between (i) the detection of the condition triggering the RRC re-establishment procedure or the reception of the RRC release with redirection command and (ii) transmission of a physical random access channel (PRACH) in a second BWP dedicated for use by UEs of the first type, wherein the determination of the delay is based on a BWP switching time for switching from the first BWP to the second BWP; and transmitting the PRACH transmission in the second BWP in accordance with the delay.

* * * * *